(12) United States Patent
Alvarez et al.

(10) Patent No.: US 10,360,304 B1
(45) Date of Patent: Jul. 23, 2019

(54) NATURAL LANGUAGE PROCESSING INTERFACE-ENABLED BUILDING CONDITIONS CONTROL SYSTEM

(71) Applicant: Imageous, Inc., Newcastle, WA (US)

(72) Inventors: Hernan Alvarez, Newcastle, WA (US);
Benjamin Ries, Newcastle, WA (US);
Jay-jen Hsueh, Newcastle, WA (US)

(73) Assignee: Imageous, Inc., Newcastle, WA (US)

( * ) Notice: Subject to any disclaimer, the term of this patent is extended or adjusted under 35 U.S.C. 154(b) by 0 days.

(21) Appl. No.: 15/997,308

(22) Filed: Jun. 4, 2018

(51) Int. Cl.
G06F 17/27 (2006.01)
G05B 13/04 (2006.01)
G05B 13/02 (2006.01)

(52) U.S. Cl.
CPC ..... G06F 17/2785 (2013.01); G05B 13/0265 (2013.01); G05B 13/042 (2013.01); G06F 17/2705 (2013.01)

(58) Field of Classification Search
CPC .. G06F 17/2735; G06F 17/273; G06F 17/274; G06F 17/2745; G06F 17/2785; G06F 17/279; G06F 17/2765; G06F 17/2705; G06F 17/2795
USPC .................................................. 704/1, 9, 10
See application file for complete search history.

(56) References Cited

U.S. PATENT DOCUMENTS

| | | | | |
|---|---|---|---|---|
| 8,538,588 B2* | 9/2013 | Kasper | ................... | G05B 15/02 700/276 |
| 9,285,134 B2* | 3/2016 | Bray | .................. | G05D 23/1902 |
| 9,699,409 B1 | 7/2017 | Reshef et al. | | |
| 9,920,944 B2* | 3/2018 | Chromy | ................. | G05B 15/02 |
| 2014/0365226 A1* | 12/2014 | Sinha | ...................... | G10L 25/00 704/275 |
| 2015/0338915 A1* | 11/2015 | Publicover | ........... | G06K 9/0061 345/633 |
| 2015/0348554 A1* | 12/2015 | Orr | ........................ | G10L 17/22 704/275 |
| 2016/0273793 A1* | 9/2016 | Chromy | ................. | G05B 15/02 |
| 2016/0365088 A1 | 12/2016 | Liang et al. | | |
| 2016/0373571 A1 | 12/2016 | Woolsey et al. | | |
| 2017/0163472 A1* | 6/2017 | Black | .................. | H04L 41/0681 |
| 2017/0163503 A1* | 6/2017 | Black | ................. | G06Q 10/0639 |
| 2017/0270093 A1 | 9/2017 | Hosn et al. | | |
| 2017/0336126 A1* | 11/2017 | Winkle | .................... | F25D 3/105 |
| 2017/0351532 A1 | 12/2017 | Li et al. | | |
| 2017/0351999 A1* | 12/2017 | Winkle | .............. | B65D 81/3895 |
| 2017/0357637 A1* | 12/2017 | Nell | ....................... | G06F 17/279 |
| 2017/0363349 A1* | 12/2017 | McHale | ................ | F25D 29/003 |
| 2018/0190272 A1* | 7/2018 | Georges | ................. | G10L 15/22 |
| 2018/0226067 A1 | 8/2018 | Dhoolia et al. | | |
| 2018/0240473 A1 | 8/2018 | Baracaldo Angel et al. | | |

* cited by examiner

*Primary Examiner* — Lamont M Spooner
(74) *Attorney, Agent, or Firm* — Rowan TELS LLC

(57) ABSTRACT

A system including a natural language processing interface to configure a user interface of a device to receive an input, understand an intent from the input, and send a second set of instructions to the device to operate the device to configure the user interface to display a feedback request and receive a second input, and a control system to select a model to transform the intent to an action to influence physical conditions of a building, determine a state of one or more components to perform the action, and send instructions to the one or more components to alter their operations to achieve the state.

19 Claims, 15 Drawing Sheets

NATURAL LANGUAGE PROCESSING INTERFACE-ENABLED BUILDING CONDITIONS CONTROL SYSTEM

BACKGROUND

Building operators face a booming growth market opportunity with significant cost, market, environmental and compliance pressures. Conventional technology in the Building Automation Systems (BAS) space may offer innovative solutions that leverage Artificial Intelligence (AI); however, those conventional solutions are often not integrated and require significant time and cost, as well as new skills and knowledge to implement. This leads to lackluster results, negative user experiences, and ultimately failed initiatives and lost investment. The operator is left in a difficult position of continuous upgrades and integrations in a taxing attempt to realize the benefits of innovation in BAS.

BRIEF SUMMARY

The disclosed system deeply integrates machine learning (ML) into existing systems and leverages rich datasets created by the BAS and occupants to deliver occupant satisfaction and operational efficiency. The result is an interactive, occupant productivity and operational efficiency system that addresses the continually changing occupancy, use patterns, and demanding modern workforce of the knowledge economy.

The system is an interactive, occupant comfort and operational efficiency solution that addresses the continually changing occupancy, use patterns, knowledge economy, and workforce demands, as well as giving the operators new levels of visibility into how their building is performing using AI. The system integrates BAS data, sensors, social data from occupant population (e.g., hot/cold/comfortable interactive feedback via a natural language processing interface, such as a chatbot or voice-driven digital assistant) and external data sources (weather, sun position, etc.) to continuously learn and utilize those learnings to dynamically, autonomously, and automatically optimize the environment.

By leveraging a supported enterprise communication/collaboration system such as Skype® for Business, Slack® for UI, or Alexa® device, occupants directly interact with the natural language processing interface to submit real time comfort requests and answer surveys on comfort initiated by the natural language processing interface. Those responses will be used to label system and external feature data for machine learning to autonomously implement immediate system changes for requests and long-term system tuning. By collecting historical and real-time environmental data, and labeling that data with the occupant feedback, the system is able to provide interactive feedback and immediate environmental changes to the occupants, as well as learn and optimize the BAS system for comfort, occupant productivity, and efficient operations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
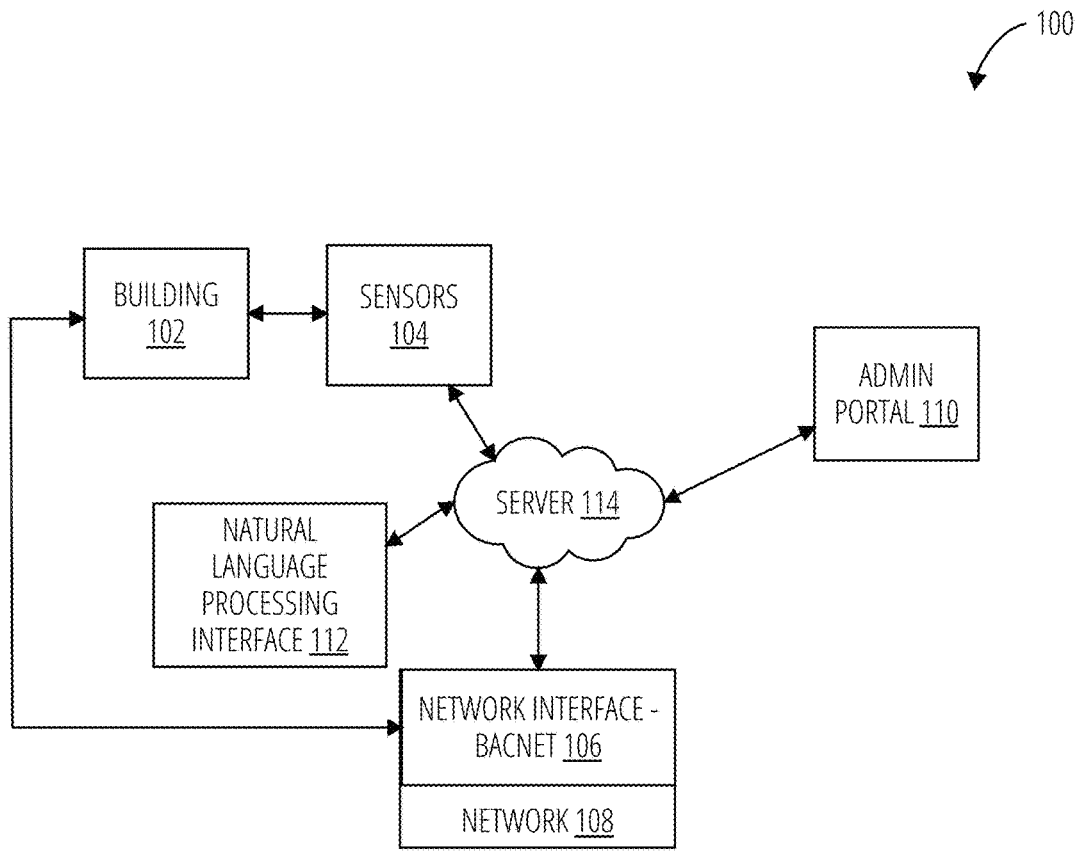
FIG. 1 illustrates an embodiment of an operational environment 100.

The operational environment 100 comprises a building 102, sensors 104, a network interface—BACnet 106, a network 108, an administrative portal 110, a natural language processing interface 112, and a server 114.

Figure 2:
FIG. 2 illustrates an embodiment of a building 200.

The building 102 has multiple components. The components may heat, cool, provide air flow, determine or change the quality of air, determine or change the humidity, or otherwise affect the physical environments within the building 102. The building 102 and the components may be coupled to the network interface—BACnet 106, providing the network 108 with current operating information (current status, set points, flow rates, temperature, etc.), and receiving instruction from the network 108 to alter the operation of any of the components. The components may also store this information. The information may be timestamped prior to being stored. In some embodiments, the information is stored for a pre-determined time period. For example, a signal may be received from the network 108 to alter an HVAC component to switch to an operating state. Further, a number of valves may be altered to a high flow state. This may then result in cooling of a space within the building 102. In some embodiments, multiples buildings may be within the operational environment 100. The building 102 may also be sub-divided into sub-buildings. An exemplary building is depicted in FIG. 2.

The sensors 104 determine the state of a parameter within the building, such as temperature, oxygen, sound, etc., and may furthermore be time-sensitive. The sensors 104 are distributed within the building 102. The sensors 104 send the states of the parameter to the server 114.

The network interface—BACnet 106 interfaces with the components of the building 102. The network interface—BACnet 106 may send operation commands to one or more of the components based on the operation of the network 108. The network interface—BACnet 106 may also provide instructions for the components to provide a snapshot of the operating conditions data for a determined time period, timestamp, etc. The network 108 may determine when the network interface—BACnet 106 sends the requests. The request may be at pre-determined intervals, randomly, in response to specific event, etc.

The network 108 receive information for components of the building 102 from the network interface—BACnet 106. The network 108 utilizes the network interface—BACnet 106 to send operating instructions to the components of the building 102. The network 108 receives information from the server 114 regarding the parameters of the sensors 104, messages from the natural language processing interface 112, inputs from the administrative portal 110, etc. The network 108 builds data and further determines to acquire further information. For example, the network 108 may in response to an input from the natural language processing interface 112 cause the natural language processing interface to display an input on a device to request further information from a user of the device. The network 108 may over time reduce the number of requests for additional information as the network 108 learns. The network 108 may utilize simple linear regression. The network 108 may utilize deep learning as the tasks become more complex. The network 108 may also utilize multiple models and select a specific model to solve a current problem and provide a predicted setting. For example, the network 108 may utilize a different model based on the time of day, such as a model for maintaining temperature throughout the building 102 at night as opposed to the day, where higher occupancy may be likely. The network 108 may further determine categories of time of day. The network 108 may also utilize different models for individuals and groups of occupants. The network 108 may further develop models for multiple groups of occupants of the building 102. The network 108 may predict likely locations of specific individuals, utilizing inputs to the natural language processing interface 112, calendars shared with the network 108, time of day, etc. and alter the building 102 in response. For example, a specific occupant may send an input via the natural language processing interface 112 to the network 108 to inform the network that the occupant is to be in a specific room. The network 108 may alter that room to the conditions based on the model for that individual. Further, the network 108 may determine that multiple individual may be occupying the same room. The network 108 may determine whether a model for that group of individuals has been generated and utilize that model, or the network 108 may utilize a combination of the individual models for the individuals to generate a predicted setting. The network 108 may also further determine optimized locations for each individual of a group of individuals. For example, the network 108 may determine a seating arrangement for a group of individuals. The network 108 may receive information regarding each individual via interaction of the individual with the natural language processing interface 112. The network 108 may determine a predicted setting or settings to, for example, minimize the cost of operating the cooling system of the building 102 and develop a temperature map based on those settings. The network 108 may then set a seating arrangement to minimize overall discomfort of the group, where discomfort may be measured by expected temperature for the individual compared to the determined individual temperature setpoint. The network 108 may utilize further parameters, such as airflow, sunlight, etc., and may consider multiple time periods of operation.

The administrative portal 110 may be utilized to access information from the sensors 104, the network interface—BACnet 106, and the network 108. For example, the administrative portal 110 may have user interface (UI) on a device to receive instructions to display the current parameter for a specific sensor. The may also display more than one sensor. The UI may further display the operating conditions of one or more of the components of the building 102 via the network interface—BACnet 106. The administrative portal 110 may be utilized to alter the components, such as altering a setpoint or operating the component. The administrative portal 110 may also be utilized to operate the network 108 to generate or update models to be utilized or predicted settings from those models. Furthermore the administrative portal may be utilized to display data around occupant comfort and productivity and display changes that the AI system has made to the BAS system. The administrative portal may further be used to send broadcast messages to all or certain occupants of a building.

The natural language processing interface 112 interacts via a UI with occupants and operators. The natural language processing interface 112 may receive an interaction from an occupant. The natural language processing interface 112 may then send a request to network interface—BACnet 106 via the server 114 to operate a component of the building 102. The network interface—BACnet 106 may utilize a model provided by the network 108. The natural language processing interface 112 may also, in response to an interaction, provide further requests for interaction. For example, the natural language processing interface 112 may generate an interaction to determine the intent of a previous interaction. The natural language processing interface 112 may determine multiple intents based on the interaction. The natural language processing interface 112 may determine a likelihood that each of the multiple intents are the intent of the interaction. The natural language processing interface 112 may select the most probable intent as part of the further requests to determine the intent of the interaction. As the natural language processing interface 112 interacts with an individual or group over time, the natural language processing interface 112 may utilize fewer interactions to determine intent. The natural language processing interface 112 may also initiate surveys of the occupants. These surveys may be initiated by the network 108 to receive information to update models. An exemplary interaction follows: the occupant utilizes the natural language processing interface 112 to state "It's quite chilly today."; 2) the natural language processing interface 112 may further request intent by responding, "Would you like me to turn the heat on?", thereby predicting an intent of the occupant; 3) The occupant responds in the natural language processing interface 112, "y"; 4) From prior interaction with other user the natural language processing interface 112 determines that 'y' affirms the prediction of turning on the heat; 5) A request is then sent to the network interface—BACnet 106 to turn on the heat for the specific occupant, which may be based on the device utilized to access the natural language processing interface, such as a mobile computer, desktop computer, etc., and influenced by the model determined for the specific user by the network 108. The natural language processing interface 112 may also interact after a period of time to determine whether the action was successful, such as requesting a response to whether the occupant is now comfortable. In addition, the natural language processing interface 112 provides labels for classification (i.e., supervised learning). In response to the user request, the network interface—BACnet 106 may provide an operating snapshot as discussed above and the natural language processing interface 112 may provide the labels from the initial user request. The network 108 may also determine for the natural language processing interface 112 to conduct a survey to provide further labels for the data. Surveys may also be initiated via the natural language processing interface 112 to determine various levels of productivity of occupants, such as determining sleep patterns, general physical status, etc. A survey may also be initiated periodically to an individual or to one or more groups of individual. These periodic surveys may be utilized to validate a model, generate new models, update existing models, etc. An operator may utilize the natural language processing interface 112 to interact with components within the building 102. The operator may input an input into the UI for the natural language processing interface 112, whereby the natural language processing interface 112 determines the intended action, such as closing a valve or turning on a heater. The natural language processing interface 112 may further interact with the operator to determine the intent of the initial input. The natural language processing interface 112 may also communicate suggested actions based on the snapshot of the components from the network interface—BACnet 106. The network 108 may provide a model of operation for a component and determine that the component has faulted. The natural language processing interface 112 may then suggest the action to the operator. In other embodiments, the network 108 may take corrective action without operator intervention.

The server 114 receives signals from the sensors 104, the network interface—BACnet 106, the network 108, the administrative portal 110, and the natural language processing interface 112. The server 114 then sends further signals in response to the sensors 104, the network interface—BACnet 106, the network 108, the administrative portal 110, and the natural language processing interface 112.

Figure 3:
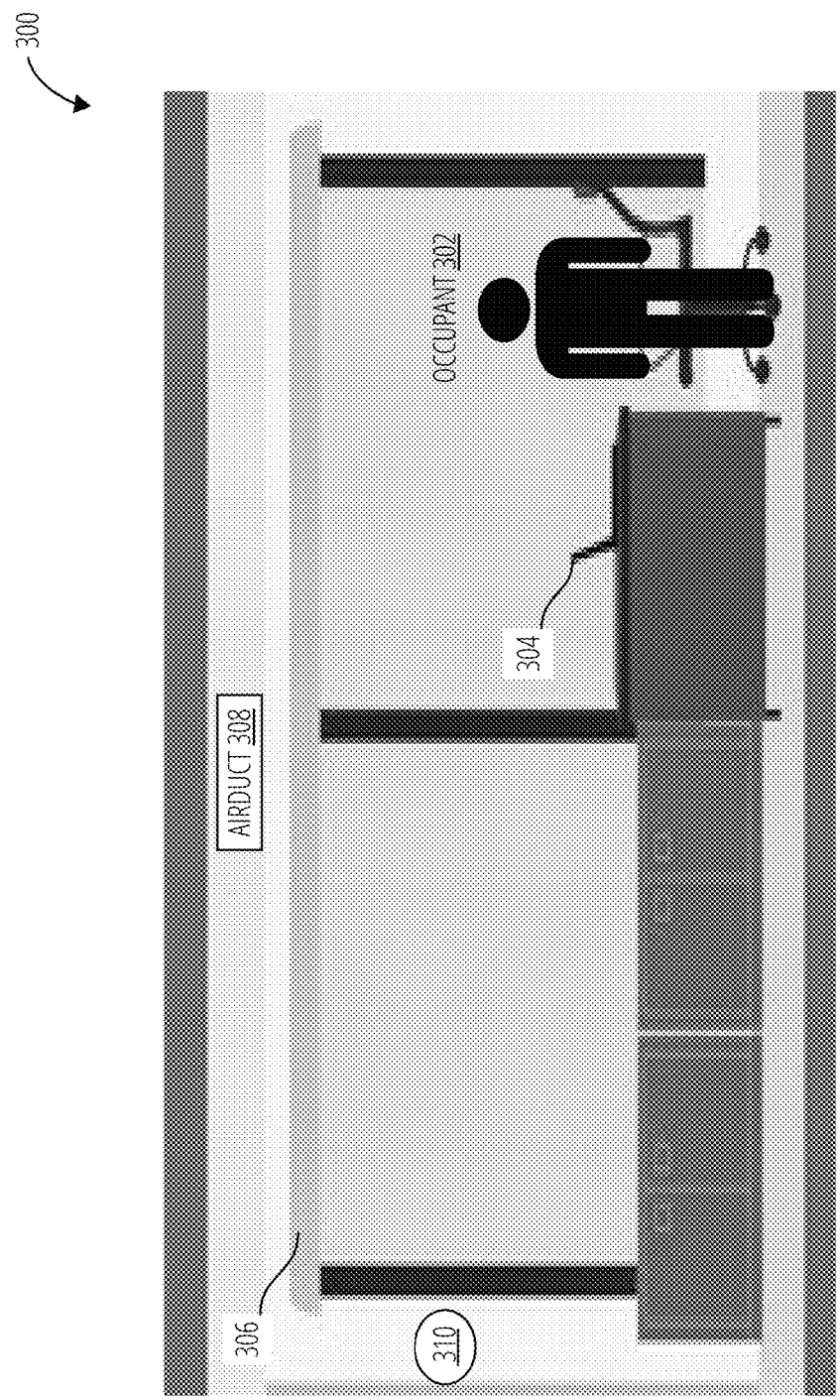
FIG. 3 illustrates an embodiment of a single-occupant office 300.
Figure 4:
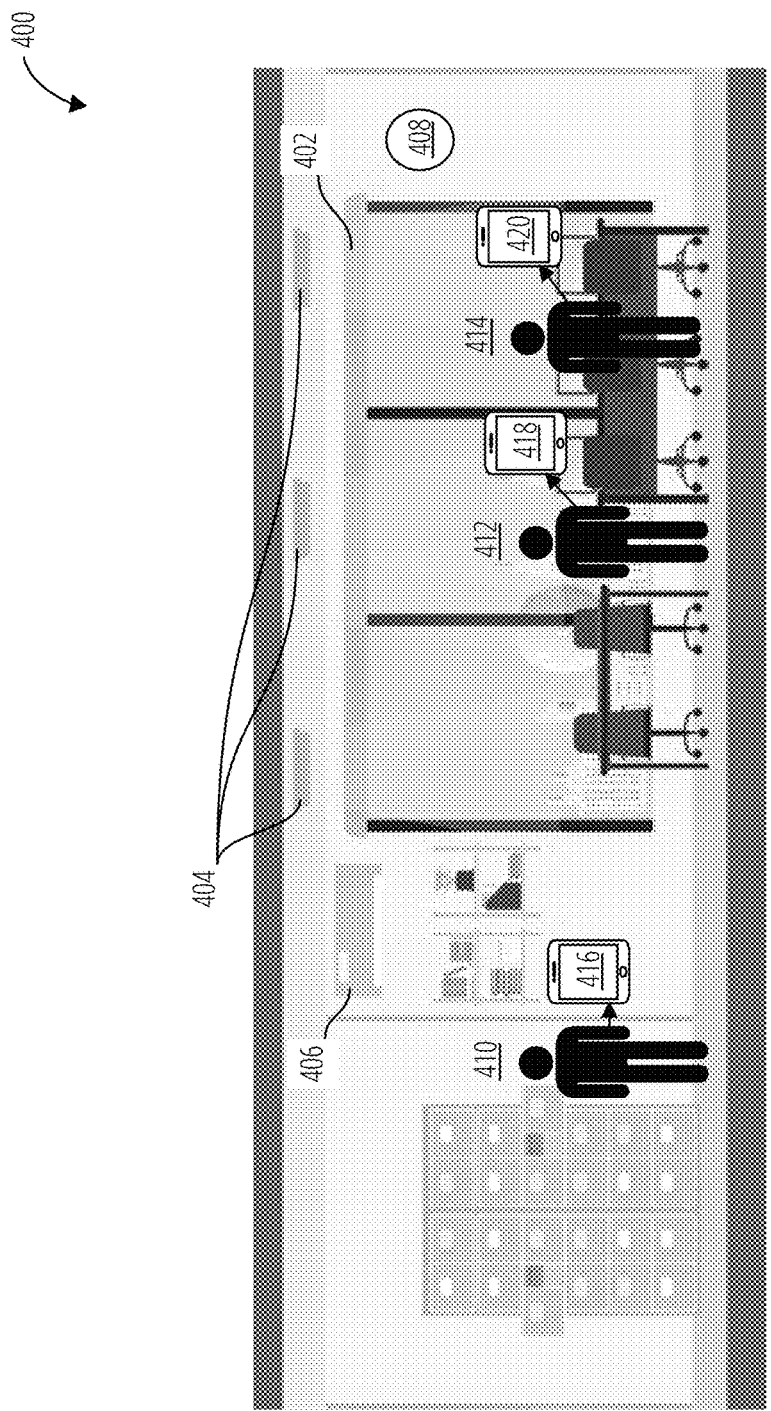
FIG. 4 illustrates an embodiment of a multiple-occupant conference room 400.

Referring to FIG. 2, FIG. 3, and FIG. 4, a building 200 comprises one or more sub-divisions, such as the single-occupant office 300 and the multiple-occupant conference room 400, one or more components, such as shades 306, an airduct 308, shades 402, lights 404, and an airduct 406. The building 200 also comprises a sensor suite 310 and a sensor suite 408. The building 200 is occupied by an occupant 302, an occupant 410, an occupant 412, and an occupant 414. Each occupant may interact with a device, such as a device 304, a device 416, a device 418, and a device 420, respectively.

The shades 306 and the shades 402 may be altered in response to an input to extend or contract vertically, thereby altering the amount of sunlight to pass through. Shades may be in different configurations, such as those that extend horizontally, those that have multiple rotating mechanisms, etc. The input to the shades 306 or the shades 402 may be a natural language processing interface interaction from the device 304 by occupant 302 or one of device 416, device 418, or device 420 by occupant 410, occupant 412, or occupant 414, respectively, with the intent that there is too much sunlight, or the network may determine from an external source that the weather is cloudy, and the input alters the shades 306 or the shades 402 to enable more sunlight. Also, the sensor suite 310 or sensor suite 408 may determine the lighting within the single-occupant office 300 or the multiple-occupant conference room 400, respectively, and based on this parameter input, the network, utilizing the BACnet, operates the shades 306 or the shades 402 to alter its state to permit more or less sunlight to pass.

The airduct 308 and the airduct 406 may be altered in response to an input to alter the airflow to the single-occupant office 300 and the multiple-occupant conference room 400. The airduct 308 and the airduct 406 may comprise flow regulators to alter the airflow. The input to the airduct 308 or the airduct 406 may be a natural language processing interface interaction from the device 304 by occupant 302 or one of device 416, device 418, or device 420 by occupant 410, occupant 412, or occupant 414, respectively, with the intent to which the response is to alter the airflow. The network may also, by utilizing a shared calendar system, indoor positioning system, beacon, etc. determine that the occupant 410, the occupant 412, and the occupant 414 may be in the multiple-occupant conference room 400 at the same time. The network may utilize a combined model to determine that the multiple-occupant conference room 400 is to be cooled utilizing the airduct 406. The network may alter the airflow prior to the arrival of the occupants. The airflow may further be altered during the time period in which the occupants are in the multiple-occupant conference room 400.

The lights 404 may emit light at various intensities, color temperatures, may include a non-emitting state, and be controlled in groups or individually. The lights 404 may operate based on an input to alter its state. For example, the network may have pre-defined time periods to set the lights 404 to the non-emitting state, such as time periods in which no occupants are present. The network may also utilize location sensors for occupants to determine whether the multiple-occupant conference room 400 is occupied and by which occupants. Here, the multiple-occupant conference room 400 is occupied by the occupant 410, the occupant 412, and the occupant 414. The network may utilize a combined model for the group to determine the amount of light to be emitted from each of the lights 404. The network may also utilize the sensor suite 408 to determine the amount of lighting in the multiple-occupant conference room 400 and adjust the lights 404 accordingly. The network may also determine that it is more energy efficient to alter the shades 402 to a state that permit more light within the multiple-occupant conference room 400 and maintain the lights 404 in a lower light-emitting state.

The sensor suite 310 and the sensor suite 408 measure one or more parameters within the single-occupant office 300 and the multiple-occupant conference room 400, respectively. Each sensor suite may determine temperature, humidity, oxygen level, $CO_2$ level, air quality, lighting level, barometric pressure, number of occupants, etc. The sensor suite 310 and the sensor suite 408 may send signals to the network to influence actions by the network.

The occupant 302, the occupant 410, the occupant 412, and the occupant 414 may utilize the device 304, the device 416, the device 418, and the device 420, respectively, to interact with the building 200. Each device may enable a UI with the natural language processing interface. The occupant may enter an input into the UI for the natural language processing interface, whereby the natural language processing interface determines the intent of the input, which may include further natural language processing interface-occupant interactions. The device may include mobile or desktop computers able to operate the UI of the natural language processing interface and may have additional connectivity to a server or cloud by, for example, wired or wireless communications. The devices may be associated with specific occupants or may be associated with an occupant by an input, such as a password, fingerprint, etc.

Figure 5:
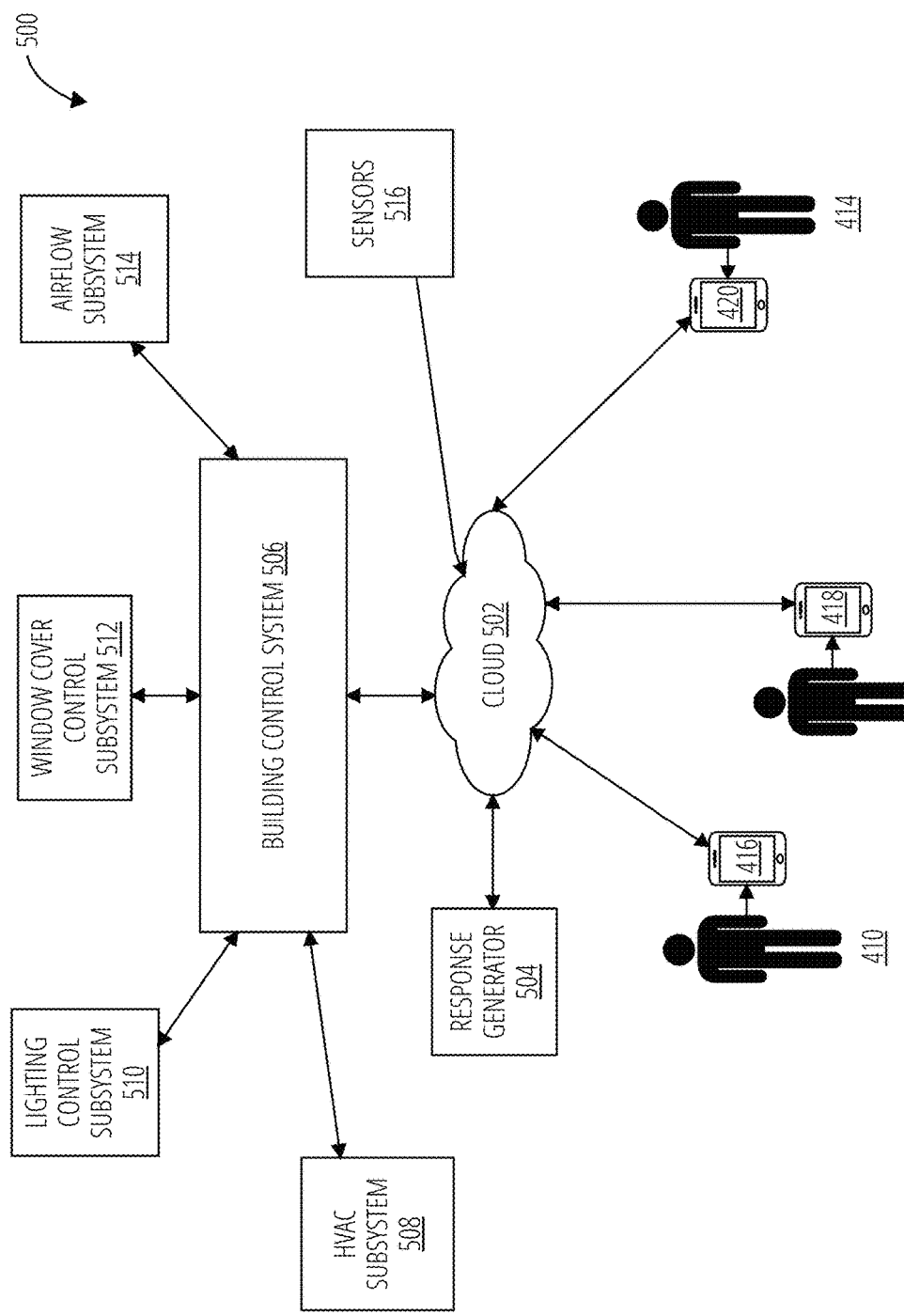
FIG. 5 illustrates an embodiment of a user-control system interface 500.

Referring to FIG. 5, a user-control system interface 500 comprises a cloud 502, a response generator 504, a building control system 506, an HVAC subsystem 508, a lighting control subsystem 510, a window cover control subsystem 512, an airflow subsystem 514, and a sensors 516. The occupant 410, the occupant 412, and an occupant 414 interact with the user-control system interface 500 utilizing the device 416, the device 418, and the device 420, respectively.

The cloud 502 is receives input from the devices and the sensors 516 and sends controls to the subsystems. The cloud 502 may send the input to the response generator 504 and receive instructions from the response generator 504 to either operate a subsystem or to interact with a device, such as by utilizing the natural language processing interface. The cloud 502 may receive feedback from the subsystems.

The response generator 504 receives inputs from the cloud 502. The inputs may be interactions on a UI of a natural language processing interface operating on a device by an occupant, may be feedback from one of the subsystems, or may be information regarding one or more parameters send by the sensors 516. The response generator 504 then determines a response to the input. This may include determining the intent of a natural language processing interface interaction and sending a control to one of the subsystems, sending a response to the natural language processing interface to help determine intent or to determine success of a response sent to a subsystem, determining that the sensors 516 indicate a response to a subsystem should be undertaken to maintain a desired setting, etc.

The building control system 506 receives inputs from the cloud 502 to operate specific subsystems and to determine the state of the subsystems. The building control system 506 sends instructions to the subsystems to alter their operation based on the input. The building control system 506 may send the feedback from the subsystems to the cloud 502.

The HVAC subsystem 508 comprises components that may heat and cool a building. The HVAC subsystem 508 receives an input from the building control system 506. The HVAC subsystem 508 may then alter the state of its one or more components to achieve the result of the input. The HVAC subsystem 508 may also send a status of its components to the building control system 506.

The lighting control subsystem 510 comprises components that may alter the lighting within a building. The lighting control subsystem 510 receives an input from the building control system 506. The lighting control subsystem 510 may then alter the state of its one or more components to achieve the result of the input. The lighting control subsystem 510 may also send a status of its components to the building control system 506.

The window cover control subsystem 512 comprises components that may alter the amount of external lighting received into a building. The window cover control subsystem 512 receives an input from the building control system 506. The window cover control subsystem 512 may then alter the state of its one or more components to achieve the result of the input. The window cover control subsystem 512 may also send a status of its components to the building control system 506.

The airflow subsystem 514 comprises components that may alter the airflow to various sub-divisions within a building. The airflow subsystem 514 receives an input from the building control system 506. The airflow subsystem 514 may then alter the state of its one or more components to achieve the result of the input. The airflow subsystem 514 may also send a status of its components to the building control system 506.

The sensors 516 determine current parameters (temperature, oxygen level, etc.). The sensors 516 may also provide information regarding external sources, such as weather, user status, etc. The external parameters may be received from websites, external sensors, personal devices (including smartwatches, FitBit®, etc.), etc. The sensors 516 may have an interface or application program interface with the cloud 502. The parameters are then sent to the cloud 502, which may then be send to the response generator 504 to determine a response action. The sensors 516 may send a signal with the parameters constantly or intermittently. The time period between updates may be influence by multiple factors, such as time of day, location of occupants, determined usefulness of the specific parameter, etc.

Figure 6:
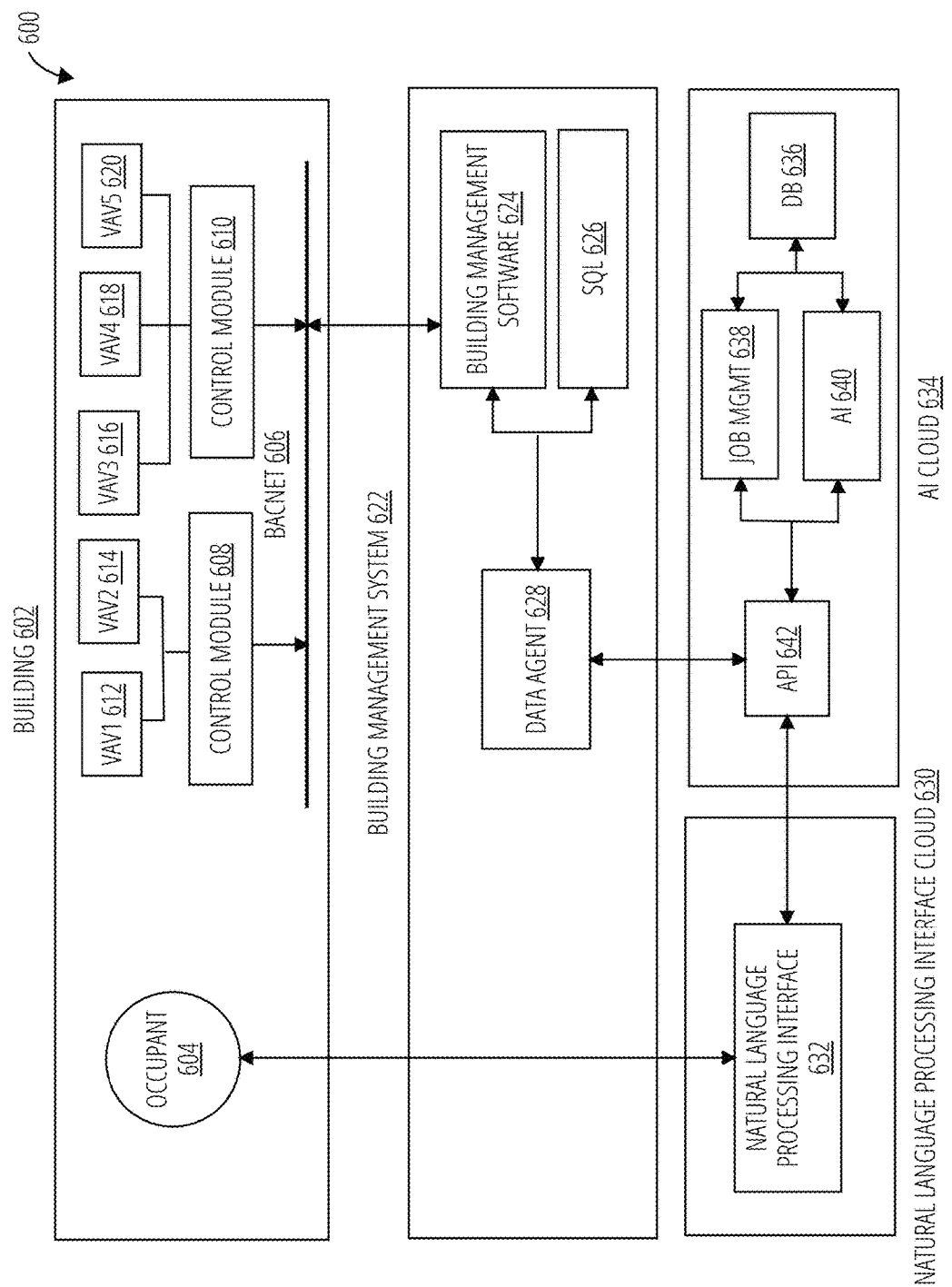
FIG. 6 illustrates an embodiment of a control system 600.

Referring to FIG. 6, a control system 600 comprises a building 602, a building management system 622, a natural language processing interface cloud 630, and an AI cloud 634. The building 602 further comprises an occupant 604, a BACnet 606, a control module 608, a control module 610, a component 612, a component 614, a component 616, a component 618, and a component 620. The building management system 622 further comprises a building management software 624, a relational database management system 626, and a data agent 628. The natural language processing interface cloud 630 further comprises a natural language processing interface 632. The AI cloud 634 further comprises a control memory structure 636, a job management system 638, an AI 640, and an API 642.

The natural language processing interface 632 and the data agent 628 may connect to the API 642 of the AI cloud 634 through a secure SSL connection. The natural language processing interface 632 and the data agent 628 continuously check a job queue for new jobs that need to be executed. The data agent 628, in some embodiments, only reaches out to pull new jobs from the queue or update the status of jobs, no inbound connections may be utilized for operation. The natural language processing interface 632 and the data agent 628 are utilized to collect occupant feedback and sensor data, respectively. The data is passed to the AI cloud 634 via the API 642. The comfort feedback of the occupant 604 (labels) is collected by the natural language processing interface 632, both as occupant-initiated comfort requests as well as natural language processing interface 632 initiated individual queries and group surveys. The data agent 628 collects sensor data (features) through BACnet 606 as well as historical data directly from the relational database management system 626.

The AI cloud 634 stores, transforms, and aggregates the data to build comfort models for each occupant 604, as well as for groups of occupants. Once the models are trained, the AI cloud 634 may dynamically adjust and optimize the environment with the help of the building management software 624, which interact with the building 602 via the BACnet 606.

The data agent 628 is either a software installation that operates on the building management system 622 or a self-contained hardware device, which may be a server. To retrieve real-time data, the data agent 628 utilizes the BACtalk protocol to read device data (e.g., the component 612, the component 614, the component 616, the component 618, and the component 620 being operate by the control module 608 and the control module 610) via BACnet 606. For historical data, Open Database Connectivity (ODBC) may be utilized to directly query the relational database management system 626. Alternatively, the data agent 628 may also directly connect to the BACnet 606 via a stand-alone device, which may replace the building management system 622.

The natural language processing interface 632 is a machine-learning based integration that includes Natural Language Processing (NLP) features. The natural language processing interface 632 learns over time and continuously improves the reactions and understanding of the organizational language around comfort, mood, productivity, well-being, environmental conditions, and location. The natural language processing interface 632 may be integrated in multiple embodiments. The common corporate collaboration systems utilized are Skype® for Business, Slack®, HipChat®, and The Facebook® Messenger. As the Bot framework available in the corporate collaboration system is utilized, the security protocols supported by those providers are utilized.

The AI cloud 634 comprises comprehensive functionalities of machine-learning, data storage, reinforcement learning, data transformation, aggregation, feature selection, model building, job management, and control logic. The API 642 control access to the AI cloud 634 by the natural language processing interface 632 and the data agent 628. The job management system 638 may select the appropriate model to be utilized, which may be stored in the control memory structure 636. The AI 640 performs machine-learning, feature selection, and model building.

When the occupant 604 requests an alteration of the building 602, the control system 600 snapshots the components and uses the following typical standard points for the zone requested to satisfy the request and learn comfort for the zone and occupant 604. The below list is only an example and additional or different points can be provided in the site survey forms:
AI-00=Space Temperature
AI-02=Discharge Air Temp
AI-10=Airflow Value (Cold deck)
AV-00=Heat Signal
AV-01=Cool Signal
AV-08=Damper % Open
BV-20=Drive Min Airflow
BV-21=Drive Max Airflow
BV-67=Occupied Status
AV-31=Desired Airflow
AV-43=Primary Air Temp
AV-90=Current Setpoint
AV-91=Setpoint High Limit
AV-92=Setpoint Low Limit
AV-93=Cooling Setpoint Offset
AV-94=Heating Setpoint Offset
AV-97=After Hours Timer Limit
AV-98=After Hours Timer
AV-99=Current Cool Setpoint
AV-100=Current Heat Setpoint
AV-101=Space Temp
AV-102=Space Humidity The snapshot of the various components along with the input from the natural language processing interface 632 to the API 642 is utilized by the AI 640 to generate and update its models which may be stored in the control memory structure 636 and accessed by the job management system 638 to determine an action to be taken in response to an input to the natural language processing interface 632 or an alteration in the operation of a component.

Figure 7:
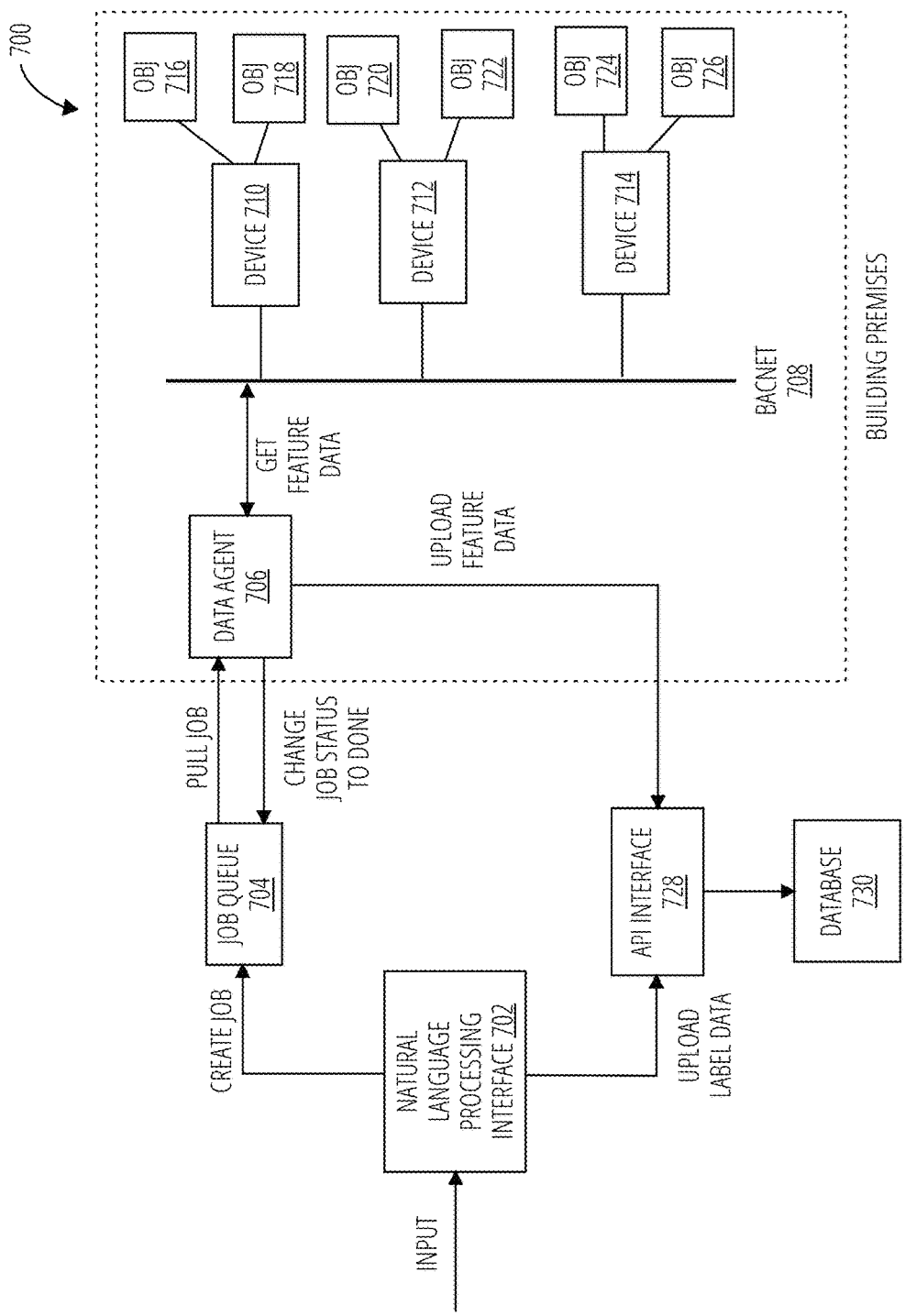
FIG. 7 illustrates an embodiment of a data labeling system 700.

Referring to FIG. 7, a data labeling system 700 comprises a natural language processing interface 702, a job queue 704, a data agent 706, a BACnet 708, a device 710, a device 712, a device 714, an object 716, an object 718, an object 720, an object 722, an object 724, an object 726, an API interface 728, and a database 730.

The natural language processing interface 702 receives an input. In response, the natural language processing interface 702 send a control signal to create a job to the job queue 704 and sends the label data (e.g., the intent of the input) to the API interface 728. The job queue 704 stores the jobs along with the status of the job, which may be updated by the data agent 706.

The data agent 706 pulls jobs from the job queue 704. The data agent 706 may select from the job queue 704 based on a first in, first out method or based on a prioritization scheme. The job queue 704 may also perform the prioritization. Additionally, subsequently received jobs may conflict with previous jobs. Conflicts may be resolved by inhibiting selection of the job by the data agent 706 for a period of time. Additionally, job that may result in the same action may be inhibited from being selected for a period of time. For example, one occupant inputting that they are cold within a pre-determined time period of another occupant stating that they are cold in the same area may be delayed until the first action has been performed and a time period has passed. The natural language processing interface 702 may generate responses to the occupant to determine if the non-performed action is still to be performed (i.e., the occupant is no longer cold due to the first action).

Once the data agent 706 has selected a job, the data agent 706 sends a control signal via the BACnet 708 to the appropriate device (e.g., the device 710, the device 712, or the device 714). In addition, the data agent 706 requests a snapshot from each device via the BACnet 708. The devices send information regarding the object 716, the object 718, the object 720, the object 722, the object 724, and the object 726 to the data agent 706 via the BACnet 708. The objects are the information that represent the operational status of the devices. The data agent 706 sends the information to the API interface 728 as feature information.

The API interface 728 receives the label information from the natural language processing interface 702 and the feature information from the data agent 706. The label and the features may then be associated by the API interface 728. The API interface 728 may utilize a timestamp, a unique identifier, or other scheme to associate the label with the features. The API interface 728 then sends the associated labels and features to the database 730. The database 730 stores the associations and may group association together. The associations may then be utilized to generate or update models.

Figure 8:
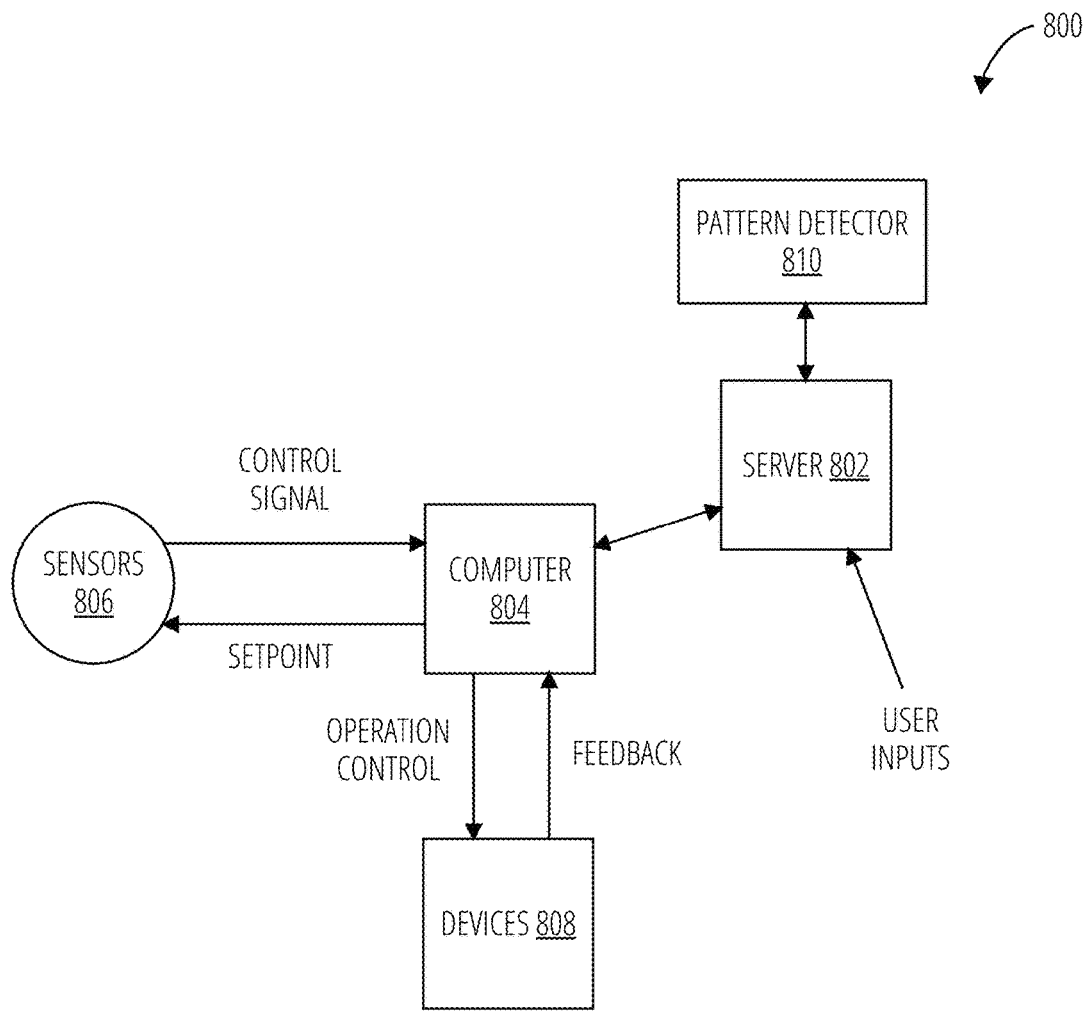
FIG. 8 illustrates an embodiment of a control system 800.

Referring to FIG. 8, a control system 800 comprises a server 802, a computer 804, sensors 806, devices 808, and a pattern detector 810.

The server 802 receives inputs. The inputs may be from a natural language processing interface operating on a communication device. The server 802 also may send a request to a computer 804 to retrieve sensor and device information. The server 802 receives the sensor and device information from the computer 804. The server 802 also sends the inputs and the sensor and device information to the pattern detector 810.

The computer 804 receives requests from the server 802 to retrieve sensor and device information. The computer 804 may request and receive this information from the sensors 806 and the devices 808. The computer 804 may also alter a setpoint of the sensors 806 and send an operational control to the devices 808. The computer 804 sends the sensor and device information to the server 802.

The sensors 806 determine one or more parameters and sends the sensor information to the computer 804. Each of the devices 808 has multiple operational states which may be altered by the computer 804. The devices 808 also send device information to the computer 804 in response to a request.

The pattern detector 810 receives the sensor and device information and the inputs. The pattern detector 810 then determines relationships between the sensor and device information and the inputs. The pattern detector 810 may request further snapshots of the sensors 806 and the devices 808 via the server 802 and the computer 804 to determine these relationships.

Figure 9:
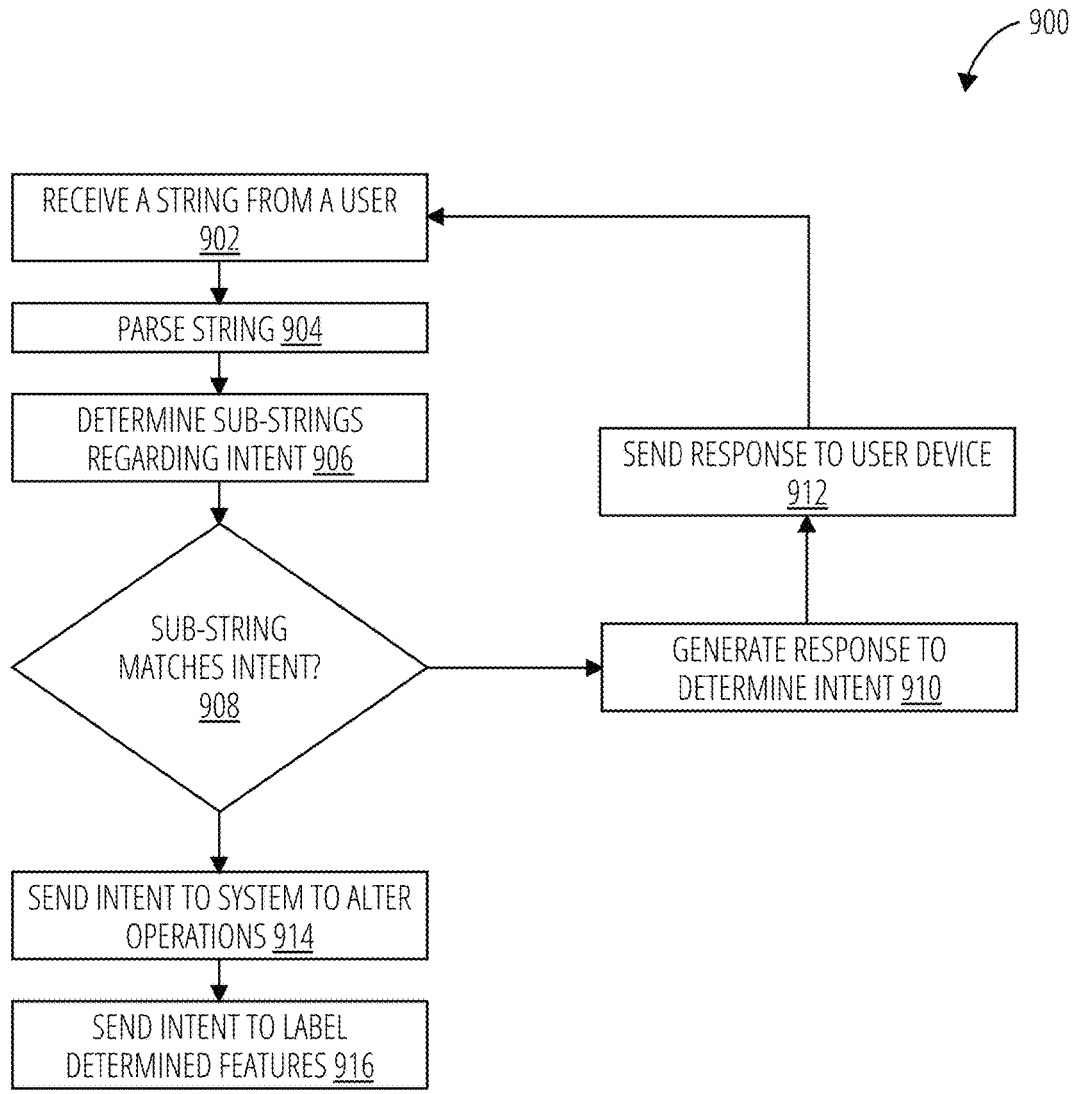
FIG. 9 illustrates an embodiment of a chat intention method 900.

Referring to FIG. 9, a chat intention method 900 receives a string from a user either through text or voice input (block 902). The string may be input to a natural language processing interface operating on a communication device. The string may comprise one or more symbols, which may further be grouped to together to form an intent. The symbols may be from various alphabets, numeral systems, emojis, etc. For example, the strings, "I am too hot.", "2 hoooooot", a flame emoji, etc. may all represent the same intent. The string is then parsed (block 904) into sub-strings. The number of symbols within the string are reduced to omit those that do not apply to intent. The chat intention method 900 then determines whether the sub-strings matches an intent (decision block 908). A number of substrings may be stored for each intent. These may be determined from interactions with the user or interaction with other users or by pre-determined settings. If the intent is not matched, a response is generated to determine intent (block 910). A most likely intent may be determined. That intent may then be phrased as a question. Further response may be generator to the user and other users to perform a survey. The response is then sent to the user device (block 912). The response operates the user interface to display the response and further operate the user interface to receive a further input to associate with that response. Once a string is input, the chat intention method 900 begins from block 902.

Figure 11:
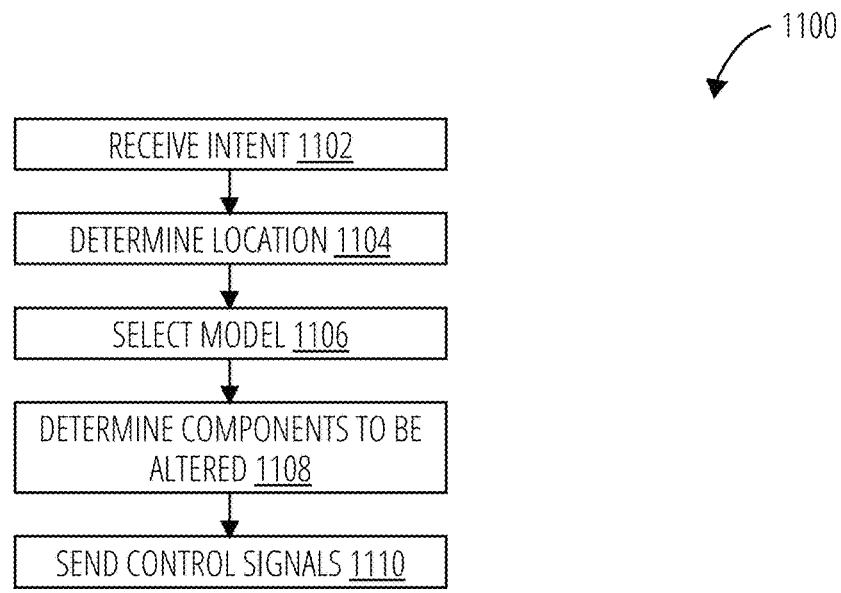
FIG. 11 illustrates an embodiment of a component control method 1100.
Figure 12:
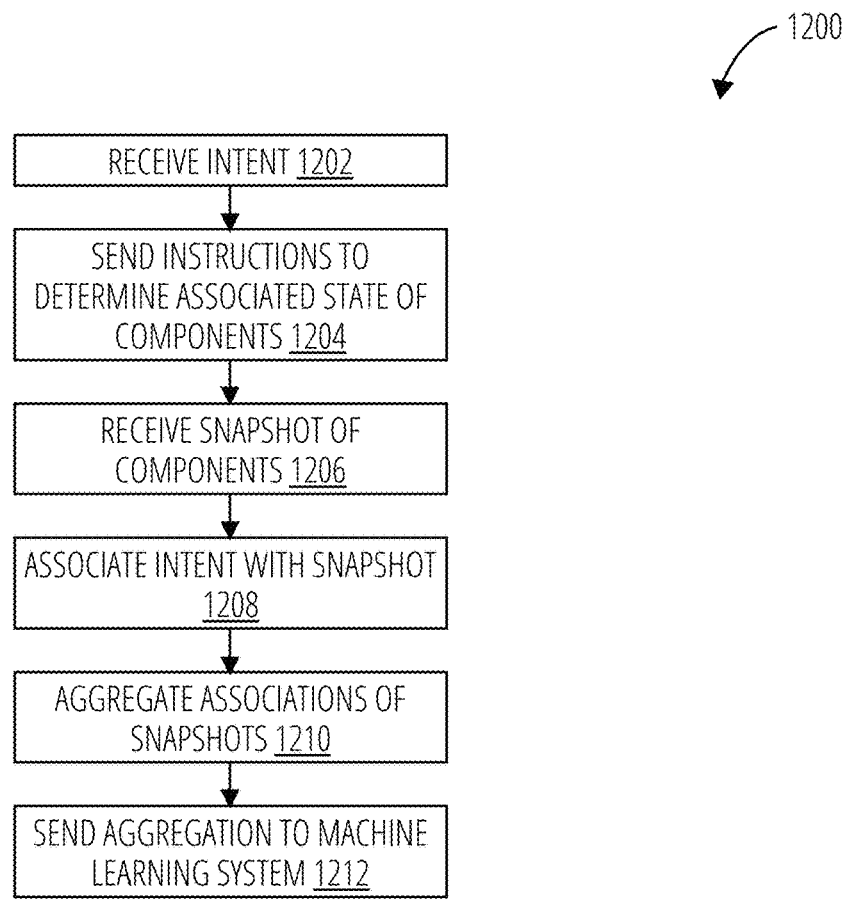
FIG. 12 illustrates an embodiment of a feature labeling method 1200.

Once the most likely intent is matched to the string input(s), the intent is sent to alter the operations of a system (block 914). The temperature alteration method 1000 is an exemplary method of utilizing intent to alter one or more components. A further method is depicted in FIG. 11. The intent is also sent to a system to label features (block 916). An exemplary feature labeling method 1200 is depicted in FIG. 12.

Figure 10:
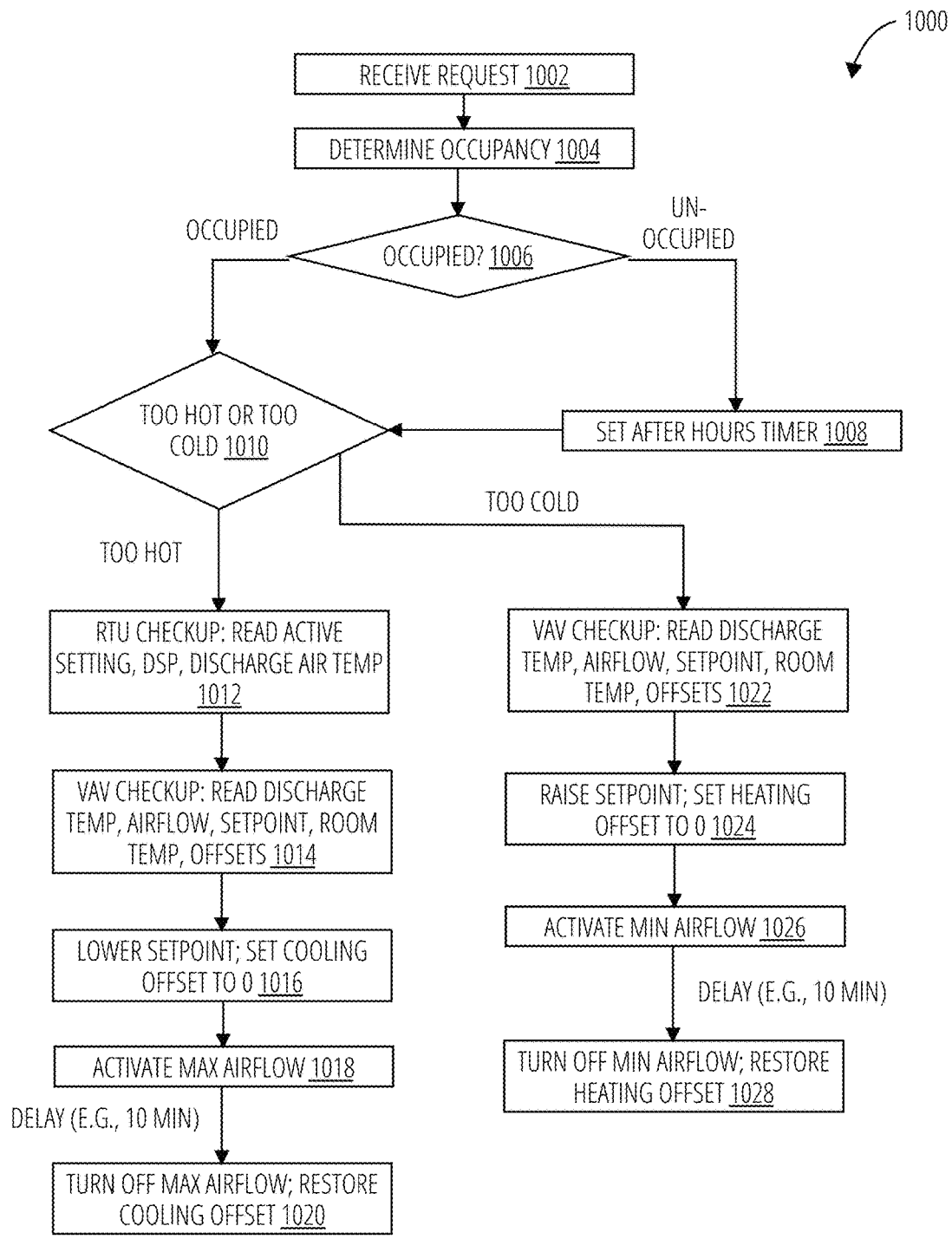
FIG. 10 illustrates an embodiment of a temperature alteration method 1000.

Referring to FIG. 10, a temperature alteration method 1000 receives a request to alter the temperature (block 1002). The request may be for a specific sub-division of a building. The occupancy is then determined (block 1004). The temperature alteration method 1000 determine if the building or sub-division is occupied. If not, an after-hours timers is set (block 1008). The timer may influence the duration of any action taken. Once set or if the building or sub-division is occupied, the temperature alteration method 1000 determines whether the request is due to the building or sub-division being too hot or too cold (decision block 1010). If too hot, a remote terminal unit (RTU) checkup is performed (block 1012). This may include reading the active setting, digital signal processing, and a discharge of the air temperature. A variable air volume checkup is performed (block 1014). This may include reading the discharged temperature and airflow and determining the setpoint, the room temperature, and any offsets. The setpoint is then lowered and the cooling offset is set to 0 (block 1016). The setpoint may be altered to 2.0 below minimum based on current setpoint and space temperature. Maximum airflow is then activated (block 1018). After a delay (e.g., 10 minutes), the maximum airflow is turned off and the cooling offset is restored (block 1020).

If too cold, a variable air volume checkup is performed (block 1022). This may include reading the discharged temperature and the airflow and determining the setpoint, the room temperature, and any offsets. The setpoint is then raised and the heating offset is set to 0 (block 1024). The setpoint may be altered to 2.0 above maximum based on current setpoint and space temperature. Minimum airflow is then activated (block 1026). After a delay (e.g., 10 minutes), the minimum airflow is turned off and the heating offset is restored (block 1028).

Referring to FIG. 11, a component control method 1100 receives an intent (block 1102). The intent may be determined from a user input to a natural language processing interface as depicted in FIG. 9. A location is then determined (block 1104). The intent may be associated with a specific occupant and device operated by the occupant. The location may be determined by a location system for the device, a pre-determined associated location for the occupant (e.g., occupant's normal location, scheduled meeting place, etc.), a response to a query by the natural language processing interface to the occupant, etc. A model is then selected (block 1106). A model may be generated for each occupant and groups of occupants. Further models may be generated for locations within the building. The component control method 1100 may utilize the individual models or a combination of models. The location further determines the components and sensors that may be utilized to determine how and which components to be altered. The models may be trained to increase productivity of occupants, ensure efficient operation of the building, etc. The components to be altered are then determined based on the models selected (block 1108). Control signals are sent to those components to alter their operation.

Referring to FIG. 12, a feature labeling method 1200 receives an intent (block 1202). The intent may be received at a natural language processing interface. Instructions are sent to determine the state of the components of a building (block 1204). The instructions may request the state of one or more of the components. In some embodiments, the state of all components is determined. The state may be the current state, one or more previously stored states, a combination, etc. The feature labeling method 1200 may utilize a BACnet coupled to each of the components to retrieve the snapshot. Additionally, the BACnet may acquire intermittent snapshots and store those snapshots to be retrieved at a later time. A control network may determine the frequency at which the BACnet retrieves these snapshots. The snapshot may further comprise sensor readings. The snapshot(s) are then received (block 1206). The snapshot(s) are then associated with the intent (block 1208). For example, snapshots for a time period prior to receiving an intent, as well as the snapshot at the time of the intent may be retrieved. The associations of snapshots are then aggregated (block 1210). Multiple similar intents with snapshots may be aggregated. Such aggregations may be utilized to determine a fault in a component. Further aggregations may be made of snapshots without label to determine whether a component may have faulted. A control system may generate an intent to initiate such an aggregation. For example, the control system may detect a steadily increasing temperature at a specific sensor. The control system may then initiate the feature labeling method 1200 with the intent being the steadily increasing temperature as the label and retrieve the features from the components. The aggregation is then sent to a machine learning system (block 1212). The system determines the relationships between the intents and the features. The system may also initiate corrective actions.

Figure 13:
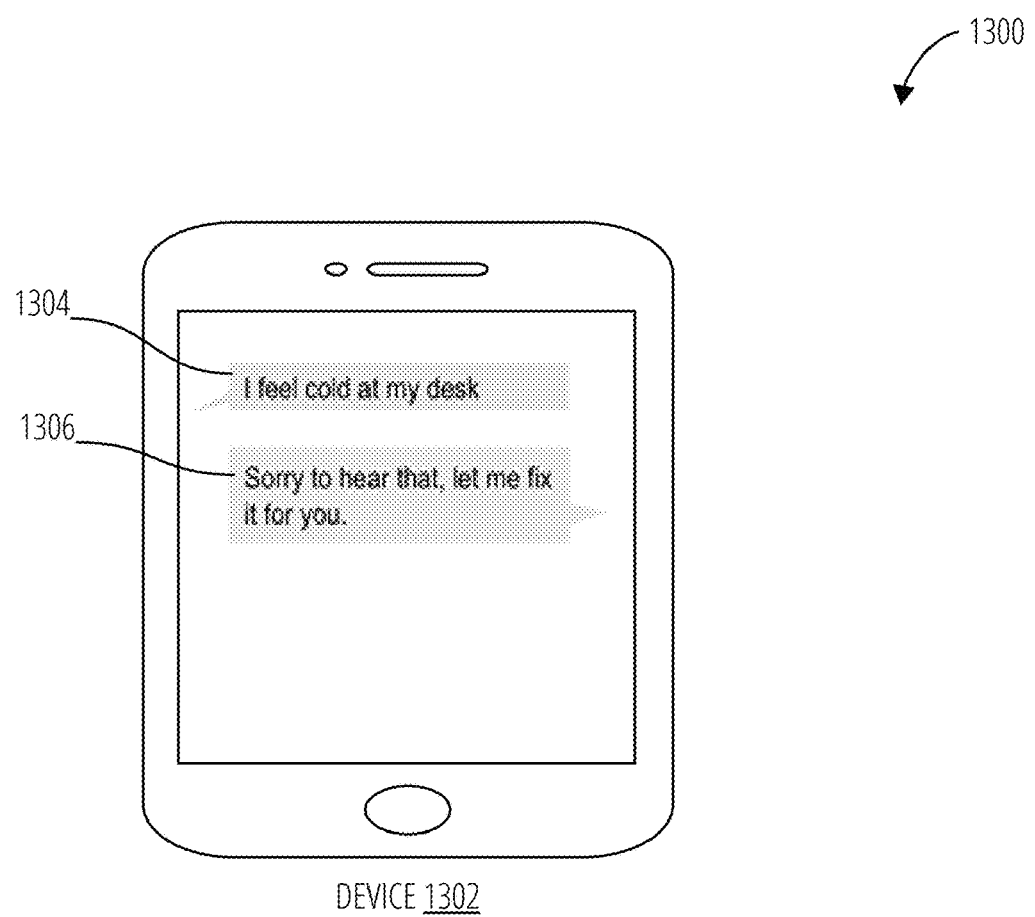
FIG. 13 illustrates an embodiment of an occupant device natural language processing interface 1300.

Referring to FIG. 13, an occupant device natural language processing interface 1300 comprises a device 1302, an occupant input 1304, and a natural language processing interface response 1306. The device 1302 may be configured to receive inputs, including audio, visual, haptic, etc. and emit outputs, such as displays, audio emissions, vibrations, etc. The occupant input 1304 is a display output associated with an input sent to a natural language processing interface. The input is associated with a specific string, "I feel cold at my desk". The occupant input 1304 may then be parsed by the natural language processing interface for intent. Here, the natural language processing interface may determine that the intent is to warm the location associated that particular occupant's desk. The natural language processing interface response 1306 is a display output of the input from the natural language processing interface to the occupant. Here, the natural language processing interface confirms that the intent is understood. The natural language processing interface may initiate follow-up input to this and other occupants based on the actions taken in response to the occupant input 1304.

Figure 14:
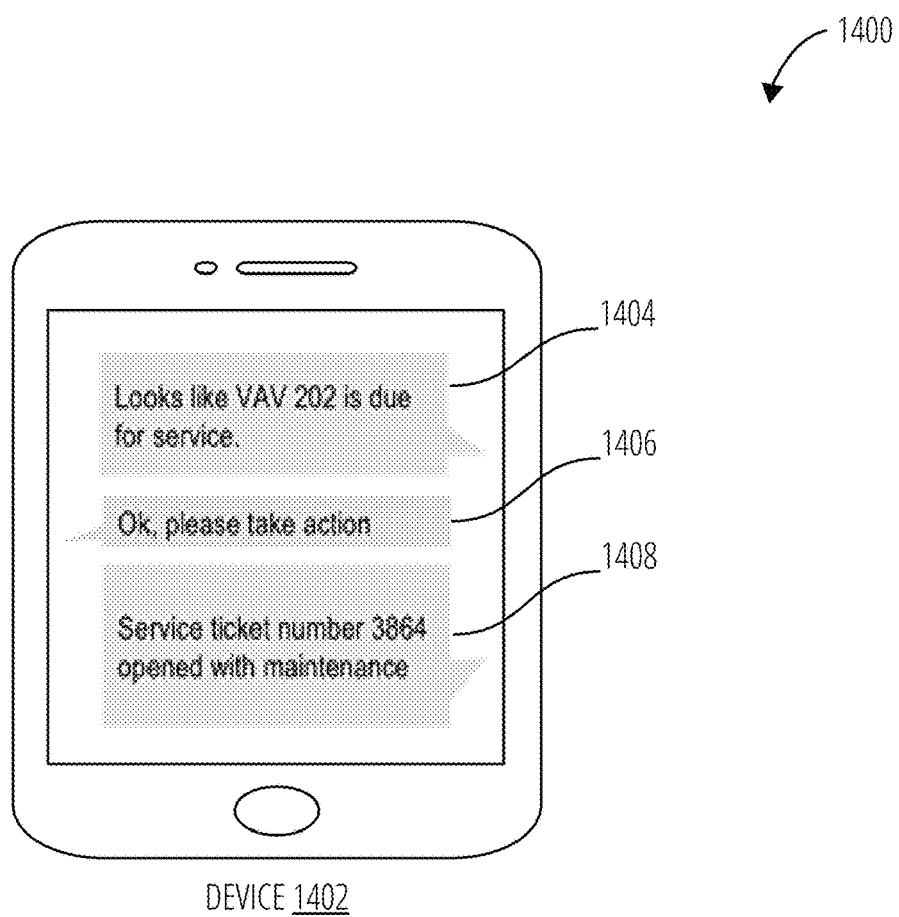
FIG. 14 illustrates an embodiment of an operator device natural language processing interface 1400.

Referring to FIG. 14, an operator device natural language processing interface 1400 comprises a device 1402, a natural language processing interface-suggested action 1404, an operator confirmation 1406, and a natural language processing interface response 1408. The device 1402 may be configured to receive inputs, including audio, visual, haptic, etc. and emit outputs, such as displays, audio emissions, vibrations, etc. The natural language processing interface-suggested action 1404 is a display output of an input sent from the natural language processing interface to an operator. Here, the natural language processing interface is suggesting an action. The natural language processing interface may initiate this particular action based on a pre-determined maintenance schedule. Alternatively, the action may have been prompted by learning that the component has faulted based on snapshots and labels, such as the label derived from the intent in occupant input 1304. The operator confirmation 1406 is a display output of an input sent to the natural language processing interface. The natural language processing interface may determine the intent of the operator confirmation 1406. Here, the intent is to confirm the action suggested by the natural language processing interface. The natural language processing interface response 1408 is a display output confirming the action of operator confirmation 1406, displaying information regarding the action taken.

Figure 15:
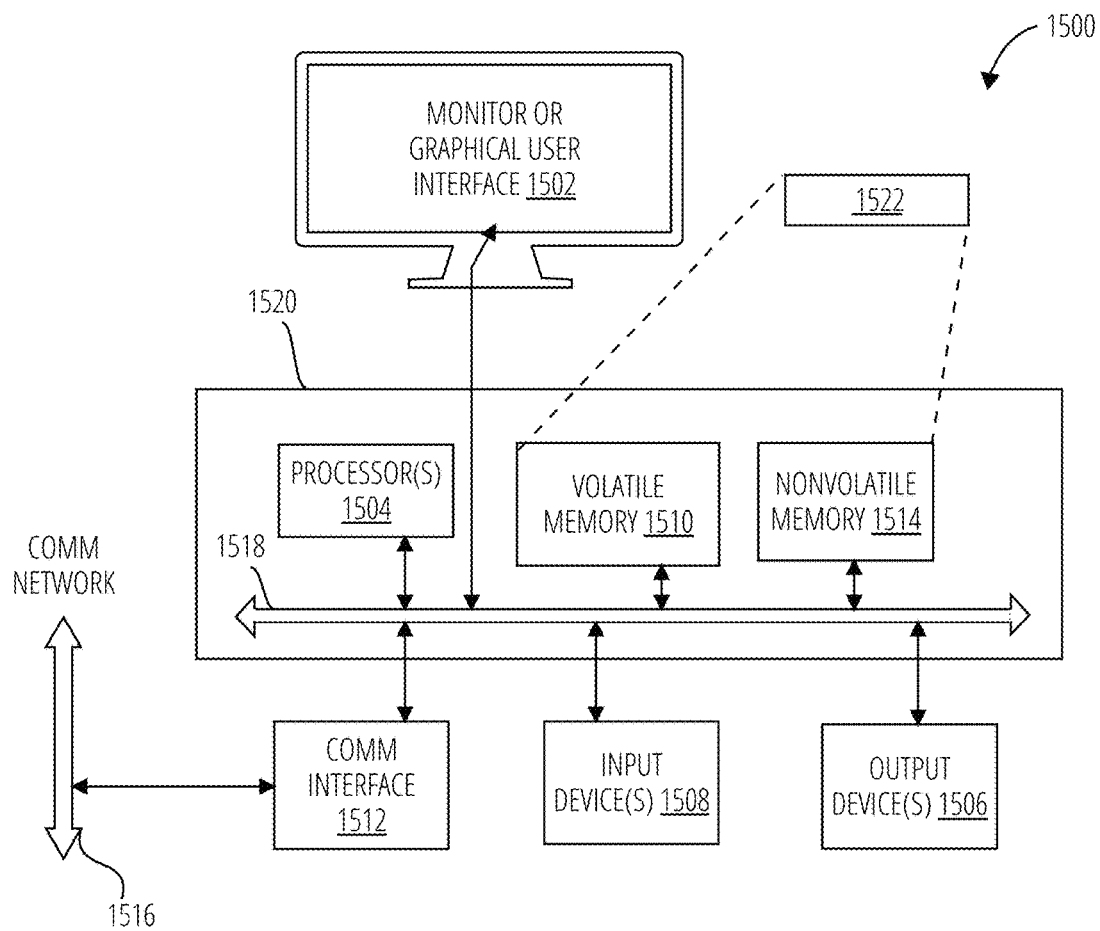
FIG. 15 is an example block diagram of a computing device 1500 that may incorporate embodiments of the present invention.

FIG. 15 is an example block diagram of a computing device 1500 that may incorporate embodiments of the present invention. FIG. 15 is merely illustrative of a machine system to carry out aspects of the technical processes described herein, and does not limit the scope of the claims. One of ordinary skill in the art would recognize other variations, modifications, and alternatives. In one embodiment, the computing device 1500 typically includes a monitor or graphical user interface 1502, a data processing system 1520, a communication network interface 1512, input device(s) 1508, output device(s) 1506, and the like.

As depicted in FIG. 15, the data processing system 1520 may include one or more processor(s) 1504 that communicate with a number of peripheral devices via a bus subsystem 1518. These peripheral devices may include input device(s) 1508, output device(s) 1506, communication network interface 1512, and a storage subsystem, such as a volatile memory 1510 and a nonvolatile memory 1514.

The volatile memory 1510 and/or the nonvolatile memory 1514 may store computer-executable instructions and thus forming logic 1522 that when applied to and executed by the processor(s) 1504 implement embodiments of the processes disclosed herein.

The input device(s) 1508 include devices and mechanisms for inputting information to the data processing system 1520. These may include a keyboard, a keypad, a touch screen incorporated into the monitor or graphical user interface 1502, audio input devices such as voice recognition systems, microphones, and other types of input devices. In various embodiments, the input device(s) 1508 may be embodied as a computer mouse, a trackball, a track pad, a joystick, wireless remote, drawing tablet, voice command system, eye tracking system, and the like. The input device(s) 1508 typically allow a user to select objects, icons, control areas, text and the like that appear on the monitor or graphical user interface 1502 via a command such as a click of a button or the like.

The output device(s) 1506 include devices and mechanisms for outputting information from the data processing system 1520. These may include the monitor or graphical user interface 1502, speakers, printers, infrared LEDs, and so on as well understood in the art.

The communication network interface 1512 provides an interface to communication networks (e.g., communication network 1516) and devices external to the data processing system 1520. The communication network interface 1512 may serve as an interface for receiving data from and transmitting data to other systems. Embodiments of the communication network interface 1512 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1512 may be coupled to the communication network 1516 via an antenna, a cable, or the like. In some embodiments, the communication network interface 1512 may be physically integrated on a circuit board of the data processing system 1520, or in some cases may be implemented in software or firmware, such as "soft modems", or the like.

The computing device 1500 may include logic that enables communications over a network using protocols such as HTTP, TCP/IP, RTP/RTSP, IPX, UDP and the like.

The volatile memory 1510 and the nonvolatile memory 1514 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1510 and the nonvolatile memory 1514 may be configured to store the basic programming and data constructs that provide the functionality of the disclosed processes and other embodiments thereof that fall within the scope of the present invention.

Logic 1522 that implements embodiments of the present invention may be stored in the volatile memory 1510 and/or the nonvolatile memory 1514. Said logic 1522 may be read from the volatile memory 1510 and/or nonvolatile memory 1514 and executed by the processor(s) 1504. The volatile memory 1510 and the nonvolatile memory 1514 may also provide a repository for storing data used by the logic 1522.

The volatile memory 1510 and the nonvolatile memory 1514 may include a number of memories including a main random access memory (RAM) for storage of instructions and data during program execution and a read only memory (ROM) in which read-only non-transitory instructions are stored. The volatile memory 1510 and the nonvolatile memory 1514 may include a file storage subsystem providing persistent (non-volatile) storage for program and data files. The volatile memory 1510 and the nonvolatile memory 1514 may include removable storage systems, such as removable flash memory.

The bus subsystem 1518 provides a mechanism for enabling the various components and subsystems of data processing system 1520 communicate with each other as intended. Although the communication network interface 1512 is depicted schematically as a single bus, some embodiments of the bus subsystem 1518 may utilize multiple distinct busses.

It will be readily apparent to one of ordinary skill in the art that the computing device 1500 may be a device such as a smartphone, a desktop computer, a laptop computer, a rack-mounted computer system, a computer server, or a tablet computer device. As commonly known in the art, the computing device 1500 may be implemented as a collection of multiple networked computing devices. Further, the computing device 1500 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Action" in this context refers to an altering of the operating state of one or more components associated within a building.

"Building" in this context refers to a physical space associated with one or more components and having physical conditions.

"Combined model" in this context refers to a model determined based on multiple model. Each model may have an associated level of influence on the combined model.

"Component snapshot" in this context refers to a set of operating conditions of one or more components at a specific time.

"Faulty components" in this context refers to components whose current operations differ from the expected operations.

"Incomplete model" in this context refers to a model whereby further information may influence a different action based on a given intent.

"Intent" in this context refers to an inferred state of an occupant based on a message utilize to alter one or more components to change the inferred state.

"Location" in this context refers to a sub-division of the building or buildings.

"Model" in this context refers to logic to convert a set of physical conditions and inputs to actions for an individual or a group of individuals.

"One or more components" in this context refers to machine whereby their operation influences the physical conditions of a building.

"One or more features" in this context refers to, for each feature, an individual measurable property or characteristic of a phenomenon being observed.

"Physical conditions" in this context refers to e.g., temperature, humidity, oxygen level, light intensity, sound level, etc.

"Pre-determined time period" in this context refers to an amount of time to retrieve component snapshot. The time period may influence the time that such snapshot are stored.

"Response" in this context refers to a machine-generated output to be displayed on a device to determine the intent of an input. A natural language processing interface may refine responses based on the effectiveness of previous responses.

"Sensor control signals" in this context refers to electrical indications of the physical conditions of a building and its sub-divisions.

"Sensors" in this context refers to physical apparatuses to convert physical conditions of a building or its sub-divisions into electrical signals.

"State" in this context refers to a configuration of operating conditions of one or more components to influence the physical conditions of a building or its sub-divisions.

What is claimed is:

1. A system comprising:
a natural language processing interface to:
configure a user interface of a device with a first set of instructions to receive a first input;
determine an intent from the first input;
apply the intent to a control system;
system for an airflow subsystem of a building; and
selectively send a second set of instructions to the device to operate the device to configure the user interface to display a feedback request and receive a second input, the second input utilized to determine an effectiveness of an action by one or more machine components comprising variable airflow volume (VAV) units of the airflow subsystem via a BACtalk interface and to update a predicted setting through machine learning; and
the control system to:
receive the intent from the natural language processing interface;
select a model to transform the intent to the action by the machine components to influence physical airflow conditions of the building;
determine a state of the machine components needed to perform the action;
control the machine components to alter their operations to achieve the state;
the airflow subsystem configured to alter the airflow to various sub-divisions within the building, where the sub-divisions comprise individual occupants and groups of occupants;
the natural language processing interface to continuously monitor a job queue for new the natural language processing interface cooperating with a data agent for the machine components to collect occupant comfort feedback and sensor data representing current states of the machine components, the occupant comfort feedback comprising (a) responses to real-time surveys communicated to the groups of occupants while located at the various subdivisions, and (b) responses to auto-generated follow-up queries to the groups of occupants to confirm comfort levels after alteration of the air flow by the airflow subsystem;
an artificial intelligence (AI) system to aggregate and transform the occupant comfort feedback and the sensor data into comfort models for groups of co-located multiple occupants of the building, the comfort models particular to the groups at specific ones of the various subdivisions;
the AI system selecting the model from the comfort models and applying the model to the airflow subsystem to dynamically and pre-emptively adjust the airflow in the various sub-divisions for the groups of co-located multiple occupants based on an expected future co-location of the multiple occupants; and
the comfort models stored in the job queue and accessed by a job management system to determine the action to be taken by the airflow subsystem in response to an occupant input to the natural language processing interface.

2. The system of claim 1, wherein the natural language processing interface is further configured to:
determine when the intent cannot be determined from the first input; generate a response to the device; and
send a third set of instructions to the device to configure the user interface to display the response to the device and receive a third input, the first input and the third input utilized to determine the intent.

3. The system of claim 2, wherein the natural language processing interface determines multiple intents from the first input, each of the multiple intents having a determined probability, the response comprising a most probable intent.

4. The system of claim 1, wherein the natural language processing interface determines the intent of the input based on a previous intent for a previous input.

5. The system of claim 4, wherein the previous input is received from one or more devices, the one or more devices including the device.

6. The system of claim 1, wherein the natural language processing interface is further configured to send a third set of instructions to one or more devices to operate the one or more devices to display a survey and receive a third input to verify the state of an environment, the device, or a user of the device.

7. The system of claim 6, wherein the control system generates the survey based on one or more of sensor control signals, an incomplete model, or a component snapshot.

8. The system of claim 6, wherein the control system generates the survey periodically.

9. The system of claim 1, wherein the instructions further cause the one or more machine components to send a component snapshot to the control system, the component snapshot transformed into one or more features and the intent transformed into a label associated with the one or more features.

10. The system of claim 9, wherein the component snapshot is utilized to influence generation of new models.

11. The system of claim 9, wherein the component snapshot is utilized to influence updating the model.

12. The system of claim 9, wherein the component snapshot comprises current operations of the one or more machine components.

13. The system of claim 9, wherein the component snapshot comprises one or more snapshots for a pre-determined time period prior to the first input.

14. The system of claim 1, wherein the control system determines the one or more comfort models based on occupants determined to be at a location associated with the first input and utilizes a combined model based on the one or more comfort models for the occupants determined to be at the location associated with the first input.

15. The system of claim 1, wherein the control system receives sensor control signals from sensors located in the building and receives external control signals from external systems via interfaces or application program interfaces, the sensor control signals and the external control signals influencing the generation of new models and updating the model.

16. The system of claim 1, wherein the control system is further configured to detect faulty components, the control system utilizing a component snapshot and sensor control signals to influence detection of the faulty components.

17. A method comprising:
receiving an input from a device;
parsing an intent from the input, the intent selected from previous intents received from one or more devices;
selecting a model based on the device associated with the input, the device having a location in a building, the location associated with one or more occupants;
transforming the intent into an action to influence physical conditions of the building based on the model selected;
sending instructions to one or more components of the building to:
  alter a state of a subset of the one or more components based on the action; and
  cause the one or more components to return a component snapshot, the component snapshot comprising current operations of the one or more components and operations of the one or more components for a pre-determined time period prior to the input; and
transforming the component snapshot into one or more features and the intent into a label associated with the one or more features;
sending a second set of instructions to the device to operate the device to display a feedback request and receive a second input, the second input utilized to determine an effectiveness of the action;
influencing an update to a predicted setting through machine learning based on the one or more features, the label, and the second input;
applying the predicted setting to airflow subsystem to operate a plurality of variable airflow volume (VAV) units via a BACtalk interface to alter the airflow to various sub-divisions within the building, where the sub-divisions comprise individual occupants and groups of occupants;
operating a natural language processing interface continuously on a job queue for new the natural language processing interface cooperating with a data agent for the components to collect occupant comfort feedback and sensor data representing current states of the components, the occupant comfort feedback comprising (a) responses to real-time surveys communicated to the groups of occupants while located at the various sub-divisions, and (b) responses to auto-generated follow-up queries to the groups of occupants to confirm comfort levels after alteration of the air flow by the airflow subsystem;
aggregating and transforming the occupant comfort feedback and the sensor data into comfort models for groups of co-located multiple occupants of the building, the comfort models particular to the groups at specific ones of the various subdivisions;
selecting the model from the comfort models and applying the model to the airflow subsystem to dynamically and pre-emptively adjust the airflow in the various sub-divisions for the groups of co located multiple occupants based on an expected future co-location of the multiple occupants; and
storing the comfort models in the job queue and accessing the comfort models to determine the action to be taken by the airflow subsystem in response to an occupant input to the natural language processing interface.

18. The method of claim 17, wherein parsing the intent comprising:
determining multiple intents;
selecting a most probable intent from the multiple intents;
altering a user interface to receive a third input to influence determining the most probable intent to be the intent.

19. The method of claim 17, wherein one or more the comfort models are selected as a combined model to be the model based on determining multiple occupants are at a location associated with the input.

* * * * *